(12) United States Patent
Tsukamoto et al.

(10) Patent No.: US 8,834,802 B2
(45) Date of Patent: *Sep. 16, 2014

(54) EXHAUST PURIFICATION SYSTEM OF INTERNAL COMBUSTION ENGINE

(75) Inventors: Yoshihisa Tsukamoto, Susono (JP); Hiromasa Nishioka, Susono (JP); Katsuhiko Oshikawa, Tokyo (JP); Hiroshi Otsuki, Susono (JP); Junichi Matsuo, Susono (JP); Shigeki Nakayama, Gotenba (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/389,486

(22) PCT Filed: Feb. 14, 2011

(86) PCT No.: PCT/JP2011/053586
§ 371 (c)(1),
(2), (4) Date: Feb. 8, 2012

(87) PCT Pub. No.: WO2012/111163
PCT Pub. Date: Aug. 23, 2012

(65) Prior Publication Data
US 2013/0315791 A1    Nov. 28, 2013

(51) Int. Cl.
*B01D 50/00* (2006.01)
*F01N 3/10* (2006.01)
(52) U.S. Cl.
USPC ............... 422/171; 60/300; 60/301

(58) Field of Classification Search
CPC ............ F01N 2370/02; F01N 2370/04; B01D 2258/012; B01D 2255/2092; B01D 2255/104; B01D 53/9431; B01D 53/944; B01D 2258/01
USPC ............ 422/177, 180; 502/64, 184, 347, 231
See application file for complete search history.

(56) References Cited

U.S. PATENT DOCUMENTS

| | | |
|---|---|---|
| 5,388,406 A | 2/1995 | Takeshima et al. |
| 2010/0101421 A1 | 4/2010 | Kanazawa et al. |

FOREIGN PATENT DOCUMENTS

| | | |
|---|---|---|
| JP | 4-281844 | 10/1992 |
| JP | 05-195755 | 8/1993 |
| JP | 8-182928 | 7/1996 |
| JP | 2801423 | 7/1998 |
| JP | 2008-240568 | 10/2008 |
| JP | 2008-240569 | 10/2008 |
| JP | 2009-112948 | 5/2009 |
| JP | 2010-504206 | 2/2010 |

*Primary Examiner* — Tom Duong
(74) *Attorney, Agent, or Firm* — Finnegan, Henderson, Farabow, Garrett & Dunner, LLP

(57) ABSTRACT

An exhaust purification system of an internal combustion engine of the present invention comprises a silver-alumina-based catalyst device arranged in the engine exhaust system. When a temperature of the silver-alumina-based catalyst device becomes a second set temperature T2 lower than a first set temperature T1 at which the silver-alumina-based catalyst device releases $NO_2$, and releases NO, the silver-alumina-based catalyst device is heated such that a temperature elevation rate thereof is increased to make the temperature T of the silver-alumina-based catalyst device be a third set temperature T3 between the first set temperature T1 and the second set temperature T2.

4 Claims, 3 Drawing Sheets

EXHAUST GAS FLOW

EXHAUST GAS FLOW

EXHAUST PURIFICATION SYSTEM OF INTERNAL COMBUSTION ENGINE

CROSS-REFERENCE TO RELATED APPLICATIONS

This application is a national phase application of International Application No. PCT/JP2011/053586, filed Feb. 14, 2011, the contents of which are incorporated herein by reference.

TECHNICAL FIELD

The present invention relates to an exhaust purification system of an internal combustion engine.

BACKGROUND ART

A known catalyst device carries silver oxide by use of alumina as a carrier coat material (for example, refer to Japanese Patent No. 2801423). Such a silver-alumina-based catalyst device adsorbs $NO_2$ in the exhaust gas and releases the adsorbed $NO_2$ when a temperature thereof becomes a set temperature. When the temperature of the silver-alumina-based catalyst device becomes the set temperature, a $NO_x$ catalyst device arranged downstream thereof has been activated and thus can purify to reduce the $NO_2$ which flows out from the silver-alumina-based catalyst device.

DISCLOSURE OF THE INVENTION

The above mentioned silver-alumina-based catalyst device does not only adsorb $NO_2$ in the exhaust gas but also NO in the exhaust gas. However, the adsorbed NO is released at a temperature lower than the set temperature. At this time, the $NO_x$ catalyst device arranged downstream thereof has not been activated. Therefore, the NO which flows out from the silver-alumina-based catalyst device is not purified by reduction in the $NO_x$ catalyst device, and is emitted into the atmosphere.

Accordingly, an object of the present invention is to provide an exhaust purification system of an internal combustion engine, comprising a silver-alumina-based catalyst device, which can decrease an amount of NO which flows out from the silver-alumina-based catalyst device when the temperature thereof is lower than a set temperature at which $NO_2$ is released.

An exhaust purification system of an internal combustion engine as set forth in claim 1 of the present invention is provided, characterized in that the system comprises a silver-alumina-based catalyst device arranged in the engine exhaust system, when a temperature of the silver-alumina-based catalyst device becomes a second set temperature lower than a first set temperature at which the silver-alumina-based catalyst device releases $NO_2$, and releases NO, the silver-alumina-based catalyst device is heated such that a temperature elevation rate thereof is increased to make the temperature of the silver-alumina-based catalyst device be a third set temperature between the first set temperature and the second set temperature.

An exhaust purification system of an internal combustion engine as set forth in claim 2 of the present invention is provided as the exhaust purification system of an internal combustion engine as set forth in claim 1 characterized in that when the temperature of the silver-alumina-based catalyst devices becomes the second set temperature, the silver-alumina-based catalyst device is heated by a flame burner or an electric heater.

An exhaust purification system of an internal combustion engine as set forth in claim 3 of the present invention is provided as the exhaust purification system of an internal combustion engine as set forth in claim 1 characterized in that the silver-alumina-based catalyst device comprises a HC adsorption layer, and when the temperature of the silver-alumina-based catalyst devices becomes the second set temperature, the HC adsorbed in the HC adsorption layer is ignited and burned so that the silver-alumina-based catalyst device is heated.

An exhaust purification system of an internal combustion engine as set forth in claim 4 of the present invention is provided as the exhaust purification system of an internal combustion engine as set forth in any one of claims 1-3 characterized in that the third set temperature is set such that a NO oxidation rate of the silver-alumina-based catalyst device at the third set temperature is equal to or larger than a NO releasing rate of the silver-alumina-based catalyst device at the second set temperature.

According to the exhaust purification system of an internal combustion engine as set forth in claim 1 of the present invention, when a temperature of the silver-alumina-based catalyst device becomes a second set temperature lower than a first set temperature at which the silver-alumina-based catalyst device releases $NO_2$, and releases NO, the silver-alumina-based catalyst device is heated such that a temperature elevation rate thereof is increased to make the temperature of the silver-alumina-based catalyst device be a third set temperature between the first set temperature and the second set temperature. Therefore, the NO released when the temperature of the silver-alumina-based catalyst device becomes the second set temperature is oxidized to $NO_2$ to be adsorbed in the silver-alumina-based catalyst device again because a temperature elevation rate thereof is increased by heating simultaneously with the NO releasing and an oxidation ability of the silver-alumina-based catalyst device is increased. Thus, when the temperature of the silver-alumina-based catalyst device is lower than the first set temperature at which $NO_2$ is released, an amount of NO which flows out from the silver-alumina-based catalyst device after the temperature thereof becomes the second set temperature can be decreased.

According to the exhaust purification system of the internal combustion engine as set forth in claim 2 of the present invention, in the exhaust purification system of an internal combustion engine as set forth in claim 1, when the temperature of the silver-alumina-based catalyst devices becomes the second set temperature, the silver-alumina-based catalyst device can be easily heated by a flame burner or an electric heater.

According to the exhaust purification system of the internal combustion engine as set forth in claim 3 of the present invention, in the exhaust purification system of an internal combustion engine as set forth in claim 1, the silver-alumina-based catalyst device comprises a HC adsorption layer, and when the temperature of the silver-alumina-based catalyst devices becomes the second set temperature, the HC adsorbed in the HC adsorption layer is ignited and burned so that the silver-alumina-based catalyst device can be easily heated.

According to the exhaust purification system of the internal combustion engine as set forth in claim 4 of the present invention, in the exhaust purification system of an internal combustion engine as set forth in any one of claims 1-3, the third set temperature is set such that a NO oxidation rate of the silver-alumina-based catalyst device at the third set temperature is equal to or larger than a NO releasing rate of the silver-alumina-based catalyst device at the second set temperature. Therefore, most of the NO released when the temperature of the silver-alumina-based catalyst device becomes the second set temperature can be oxidized to $NO_2$ to be adsorbed in the silver-alumina-based catalyst device again and thus an amount of NO which flows out from the silver-alumina-based catalyst device can be sufficiently decreased.

BEST MODE FOR CARRYING OUT THE INVENTION

Figure 1:
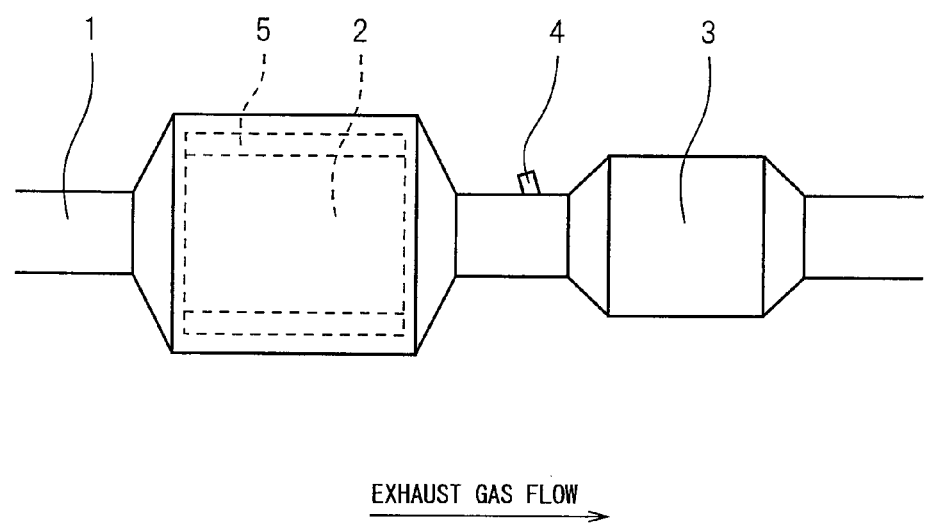
FIG. 1 is a schematic view showing an embodiment of the exhaust purification system of an internal combustion engine according to the present invention.

FIG. 1 is a schematic view showing an embodiment of the exhaust purification system of an internal combustion engine according to the present invention. In FIG. 1, reference numeral 1 is an exhaust passage of the engine. The engine is a diesel engine or a direct fuel injection-type spark-ignition engine which performs lean combustion. The exhaust gas of such an engine includes a relatively large amount of $NO_x$ so that a silver-alumina-based catalyst device 2 for adsorbing $NO_x$ is arranged in the exhaust passage 1. A $NO_x$ reduction catalyst device 3 for reducing $NO_x$ is arranged downstream of the silver-alumina-based catalyst device 2. A reducing material supply device 4 is arranged between the silver-alumina-based catalyst device 2 and the $NO_x$ reduction catalyst device 3. An electric heater 5 for heating the silver-alumina-based catalyst device 2 is arranged around the silver-alumina-based catalyst device 2.

The silver-alumina-based catalyst device 2 carries silver oxide by use of alumina as a carrier coat material, can adsorb $NO_2$ in the exhaust gas as silver nitrate, and releases the adsorbed $NO_2$ if a first set temperature (about 300 degrees C.) is reached. At this time, the $NO_x$ reduction catalyst device 3 has been sufficiently activated and thus the released $NO_2$ can be purified by reduction at the $NO_x$ reduction catalyst device 3 by a reducing material supplied from the reducing material supply device 4. Thus, if the silver-alumina-based catalyst device 2 is arranged upstream of the $NO_x$ reduction catalyst device 3, it is possible to sufficiently keep the $NO_2$ in the exhaust gas from released into the atmosphere before the $NO_x$ reduction catalyst device 3 is activated.

The silver-alumina-based catalyst device 2, for example, comprises a honeycomb-shaped base material on which an alumina $Al_2O_3$ carrier coat layer is formed and carrying silver oxide $Ag_2O$ on the alumina carrier coat layer in a ratio of silver 0.2 mol to alumina 200 g (for improving the heat resistance, lanthanum La may also be mixed in).

As the method of preparation of such a catalyst, for example, alumina MI386 ($La/Al_2O_3$) powder 1600 g, a binder A520 710.4 g, and water 3600 g are stirred by an atriter for 20 minutes, then the mixture is coated on the base material at 200 g/liter per unit volume. Next, this is fired in the atmosphere at 250 degrees C. for 30 minutes, then fired at 500 degrees C. for 1 hour to form an alumina carrier coat layer on the base material.

On the other hand, ion exchanged water is added to silver nitrate 236.2 g to make it dissolve to give a volume of 1700 cc to thereby prepare a silver nitrate aqueous solution with an Ag concentration of 0.82 mol/liter.

The above-mentioned alumina carrier coat layer is immersed in such a silver nitrate aqueous solution for 30 minutes to cause Ag to be carried at 0.2 mol/liter per unit volume by absorption. Next, a blower type dryer is operated to dry the catalyst for 20 minutes, the catalyst is fired in the atmosphere at 550 degrees C. for 3 hours, then the catalyst is fired at 500 degrees C. for 3 hours while running nitrogen containing 5% of hydrogen at a rate of 7 liters a minute.

In a catalyst which is prepared in this way, the silver oxide $Ag_2O$ is exposed from the alumina $Al_2O_3$ carrier coat layer. After the NO in the exhaust gas is oxidized to $NO_2$, this can be held well as silver nitrate $AgNO_3$.

The $NO_x$ reduction catalyst device 3 can be made a three-way catalyst device. In this case, from the reducing material supply device 4, as the reducing material, for example, the fuel is supplied. The air-fuel ratio of the exhaust gas in the three-way catalyst device is made rich to purify the $NO_x$ by reduction.

Further, the $NO_x$ reduction catalyst device 3 can be made a selective reduction type $NO_x$ catalyst device which uses ammonia $NH_3$ to selectively purify $NO_x$ by reduction. In this case, the reducing material supply device 4 supplies urea as a reducing material, for example. At the selective reduction type $NO_x$ catalyst device, the urea is hydrolyzed to generate ammonia to purify the $NO_x$ by reduction.

Further, if the $NO_x$ reduction catalyst device 3 is comprised of an upstream side oxidation catalyst device (carrying platinum Pt, silver Ag, or copper Cu, etc.) which can partially oxidize the hydrocarbons in the exhaust gas and a downstream side catalyst device (carrying platinum Pt or rhodium Rh) which purify nitrogen-containing hydrocarbon compounds (amine compounds, isocyanate compounds, and nitroso compounds) generated in the oxidation catalyst device from the partially oxidized hydrocarbons and $NO_x$ in the exhaust gas, hydrocarbons (fuel) are supplied as a reducing material from the reducing material supply device 4 for purifying the $NO_x$. In particular, if the supplied hydrocarbons are used to make the air-fuel ratio of the exhaust gas a 15.5 or less lean air-fuel ratio, the nitrogen-containing hydrocarbon compounds become easier to generate in the oxidation catalyst device and substantially all of the $NO_x$ in the exhaust gas can be purified.

As explained above, until the silver-alumina-based catalyst device 2 becomes the first set temperature (T1), the $NO_2$ in the exhaust gas which is adsorbed as silver nitrate $AgNO_3$ is released when the silver-alumina-based catalyst device 2 becomes the first set temperature (T1), and the released $NO_2$ can be purified by reduction by the downstream side $NO_x$ reduction catalyst device 3.

On the other hand, the NO in the exhaust gas is also adsorbed at the silver-alumina-based catalyst device 2, but the NO is adsorbed at the silver-alumina-based catalyst device 2 as silver nitrite $AgNO_2$. The NO which is adsorbed as silver nitrite ends up being released from the silver-alumina-based catalyst device 2 at a second set temperature (T2) (about 150 degrees C.) which is lower than the first set temperature (T1). At this time, the downstream side $NO_x$ reduction catalyst device 3 is not sufficiently activated, and the NO which flows out from the silver-alumina-based catalyst device 2 ends up being released into the atmosphere without being purified by reduction at the $NO_x$ reduction catalyst device 3.

Due to this, at the second set temperature (T2) which is lower than the first set temperature (T1) at which $NO_2$ is released, it is desirable to reduce the amount of NO which flows out from the silver-alumina-based catalyst device.

Figure 2:
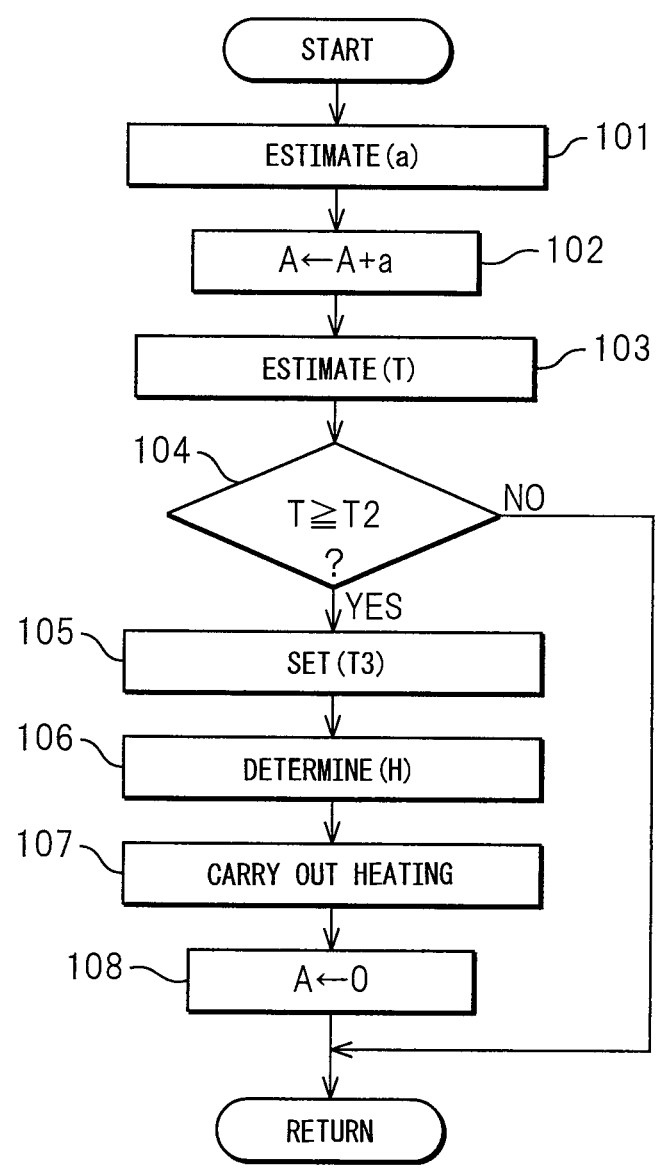
FIG. 2 is a flow-chart showing a heating control of the silver-alumina-based catalyst device carried out in the exhaust purification system according to the present invention.

To realize this, in the exhaust purification system of an internal combustion engine of the present embodiment, an electronic control unit (not shown) operates the electric heater 5 in accordance with the flow of the first flow chart shown in FIG. 2 to carry out a heating control of the silver-alumina-based catalyst device 2. The flow of the first flow chart of FIG. 2 is started at the same time as engine startup.

First, at step 101, it is estimated that an amount of NO (a) exhausted from each cylinder is newly adsorbed in the silver-alumina-based catalyst device 2 as silver nitrite $AgNO_2$ per unit time (interval of execution of flow chart) on the basis of the current engine operating condition. For example, such an amount of NO (a) can be experimentally set in a map each engine operating condition and such a map can be used in the estimation at step 101.

Next, at step 102, the amount of NO (a) estimated at step 101 is integrated to calculate a current amount of NO (A) adsorbed in the silver-alumina-based catalyst device 2. At step 103, a current temperature (T) of the silver-alumina-based catalyst device 2 is estimated. For example, a temperature sensor is arranged immediately downstream of the silver-alumina-based catalyst device 2 to measure a temperature of the exhaust gas flowing out from the silver-alumina-based catalyst device 2, and the measured temperature may be used as the current temperature (T) of the silver-alumina-based catalyst device 2. The current temperature (T) of the silver-alumina-based catalyst device 2 may be estimated on the basis of a temperature of the exhaust gas flowing into the silver-alumina-based catalyst device 2, which is estimated on the basis of the current engine operating condition. The temperature of the silver-alumina-based catalyst device 2 may be directly measured.

Next, at step 104, it is determined if the current temperature (T) of the silver-alumina-based catalyst device 2 reaches the second set temperature (T2) (or a temperature slightly lower than the second set temperature). When the result at step 104 is negative, the routine is finished.

On the other hand, when the result at step 104 is positive, at step 105, a releasing rate (VL) of NO released from the silver-alumina-based catalyst device 2 at the second set temperature (T2) is estimated on the basis of the current amount of adsorbed NO (A), and a third temperature (T3) of the silver-alumina-based catalyst device 2 is set such that an oxidation rate (VO) of NO to $NO_2$ in the silver-alumina-based catalyst device 2 at the third temperature is equal to the releasing rate (VL). The larger the amount of NO (A) adsorbed in the silver-alumina-based catalyst device 2 at this time is, the larger the releasing rate (VL) of NO released from the silver-alumina-based catalyst device 2 at the second set temperature (T2) (about 150 degrees C.), i.e., an amount of NO released per unit time is. The higher the temperature of the silver-alumina-based catalyst device 2 is, the larger the oxidation rate of the silver-alumina-based catalyst device 2, i.e., an amount of NO oxidized per unit time is.

Next, at step 106, a quantity of heat (H) generated by the electric heater 5 which is needed to elevate from the second set temperature (T2) of the silver-alumina-based catalyst device 2 to the third set temperature (T3) is determined. At step 107, the quantity of heat (H) determined at step 106 is generated by the electric heater 5, preferably instantaneously, and thus the silver-alumina-based catalyst device 2 is heated.

Next, at step 108, the amount of NO (A) adsorbed in the silver-alumina-based catalyst device 2 is reset to 0 and the routine is finished. When the temperature of the silver-alumina-based catalyst device 2 is equal to or higher than the third set temperature (T3), NO in the exhaust gas is oxidized to $NO_2$ and is adsorbed in the silver-alumina-based catalyst device so that the amount of NO (a) estimated at step 101 is 0 and the amount of NO (A) adsorbed in the silver-alumina-based catalyst device 2 is maintained to 0 during the engine operation. After the amount of adsorbed NO (A) is reset to 0 at step 108, the amount of adsorbed NO (A) may be forcibly maintained to 0 for the next engine startup.

Figure 3:
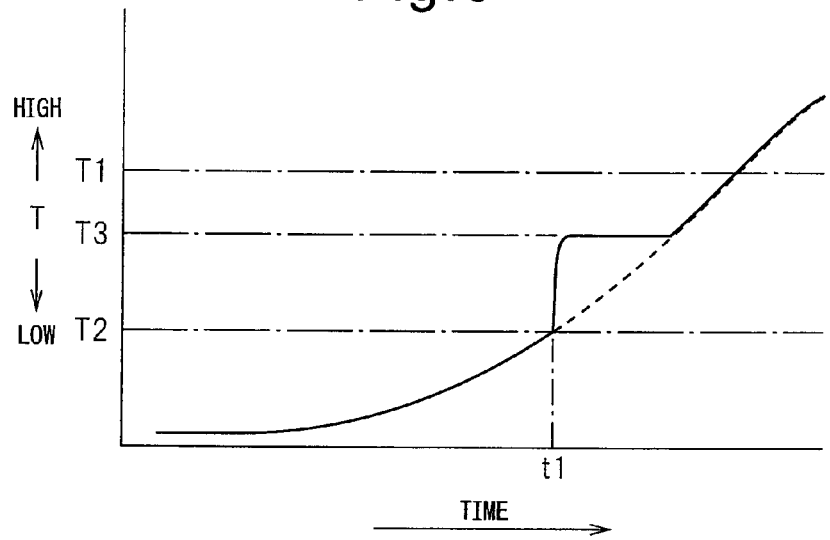
FIG. 3 is a time-chart showing a change in the temperature of the silver-alumina-based catalyst device according to the heating control of FIG. 2.

FIG. 3 is a time chart showing a change in the temperature of the silver-alumina-based catalyst device 2 according to the heating control of the flow chart of FIG. 2. The temperature (T) of the silver-alumina-based catalyst device 2 from the engine startup gradually becomes higher according to the elapsed time and reaches the second set temperature (T2) at a time (t1). At this time, the releasing of NO adsorbed as silver nitrite $AgNO_2$ from the engine startup to the time (t1) is begun.

When the heating control is not carried out, the temperature (T) of the silver-alumina-based catalyst device 2 merely increases gradually as shown by a dotted line and the oxidation ability of the silver-alumina-based catalyst device 2 also merely increases gradually. Therefore, NO released from the silver-alumina-based catalyst device 2 almost flows out from the silver-alumina-based catalyst device 2 without the oxidation to $NO_2$ and is emitted into the atmosphere as it is because the $NO_x$ reduction catalyst device 3 arranged downstream thereof is not sufficiently activated.

However, by the heating control of the flow chart in FIG. 2, the temperature (T) of the silver-alumina-based catalyst device 2 is instantaneously increased to the third set temperature (T3) at the time (t1) as shown by a solid line. The third set temperature (T3) is set such that the NO oxidation rate (VO) of the silver-alumina-based catalyst device 2 at the third set temperature (T3) is equal to the NO releasing rate (VL) when the temperature of the silver-alumina-based catalyst device 2 is the second set temperature (T2) so that the most NO released from the silver-alumina-based catalyst device 2 after the temperature thereof becomes the second set temperature (T2) can be oxidized to $NO_2$ in the silver-alumina-based catalyst device 2 of which temperature is made the third set temperature (T3) and can be adsorbed again therein. Thus, an amount of NO flowing out from the silver-alumina-based catalyst device can be sufficiently decreased.

If the third set temperature (T3) is set such that the NO oxidation rate (VO) of the silver-alumina-based catalyst device 2 at the third set temperature (T3) is larger than the NO releasing rate (VL) when the temperature of the silver-alumina-based catalyst device 2 is the second set temperature (T2), the NO released from the silver-alumina-based catalyst device 2 after the temperature thereof becomes the second set temperature (T2) can be almost oxidized to $NO_2$ and can be almost adsorbed again. Therefore, NO does not almost flow out from the silver-alumina-based catalyst device.

The temperature elevation rate of the silver-alumina-based catalyst device 2 from the second set temperature (T2) to the third set temperature (T3) is surely increased by the heating of the silver-alumina-based catalyst device 2. A period while the temperature of the silver-alumina-based catalyst device 2 is elevated from the second set temperature (t2) to the third set temperature (T3) is preferably shortened as far as possible and is desired to be instantaneous as shown in FIG. 3.

However, at the time (t1) (when the temperature of the silver-alumina-based catalyst device 2 becomes the second set temperature (T2)), if the silver-alumina-based catalyst device 2 is heated to increase the temperature elevation rate thereof, the oxidation ability of the silver-alumina-based catalyst device 2 can be surely increased. Therefore, at least part of NO flowing out from the silver-alumina-based catalyst device 2 as it is can be oxidized to $NO_2$ in the silver-alumina-based catalyst device 2 and can be adsorbed therein. Thus, an amount of NO flowing out from the silver-alumina-based catalyst device 2 after the temperature thereof becomes the second set temperature (T2) can be decreased.

If the third set temperature (T3) is not lower than the first set temperature (T1) at which the silver-alumina-based catalyst device 2 releases $NO_2$, NO can be oxidized to $NO_2$ therein but $NO_2$ cannot be adsorbed therein. Thus, if $NO_2$ flows out from the silver-alumina-based catalyst device 2, $NO_2$ is emitted into the atmosphere as it is because the $NO_x$ reduction catalyst device 3 arranged downstream thereof is not sufficiently activated.

In the present embodiment, the third set temperature (T3) is made between the first set temperature (T1) and the second set temperature (T2) and the silver-alumina-based catalyst device 2 is maintained at the third set temperature (T3) as it is after the temperature thereof is elevated to the third set temperature (T3) at the time (t1). If the temperature of the exhaust gas exhausted from the cylinders becomes higher than the third set temperature (T3), the temperature of the silver-alumina-based catalyst device is gradually increased to the first set temperature (T1) with the temperature of the $NO_x$ reduction catalyst device 3. Therefore, when the temperature of the silver-alumina-based catalyst device 2 elevates to the first set temperature (T1) and $NO_2$ is released from the silver-alumina-based catalyst device 2, the $NO_x$ reduction catalyst device 3 arranged downstream thereof has been sufficiently activated.

Thus, while NO is released from the silver-alumina-based catalyst device 2 after the time (t1), it is preferable that the temperature of the silver-alumina-based catalyst device 2 is maintained at the third set temperature (T3). For this purpose, after the temperature of the silver-alumina-based catalyst device 2 is elevated to the third set temperature (T3), it is preferable that the electric heater 5 continues heating the silver-alumina-based catalyst device 2.

Figure 4:
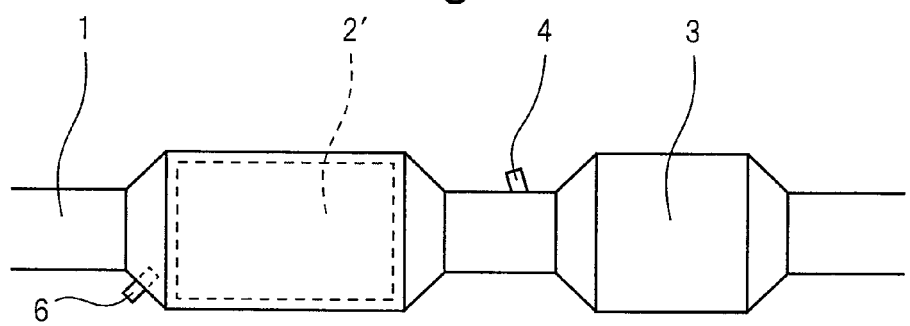
FIG. 4 is a schematic view showing another embodiment of the exhaust purification system of an internal combustion engine according to the present invention.
Figure 5:
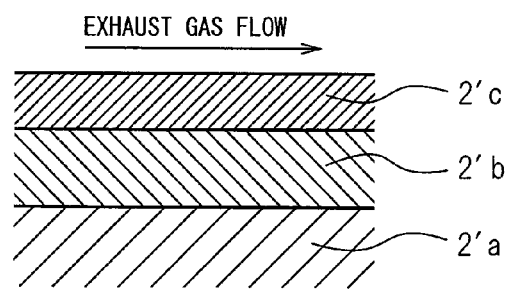
FIG. 5 is an enlarged partial sectional view of the silver-alumina-based catalyst device.

FIG. 4 is a schematic view showing another embodiment of the exhaust purification system of an internal combustion engine according to the present invention. A difference between the present embodiment and the embodiment shown in FIG. 1 is that the heating means of the silver-alumina-based catalyst device 2' is not the electric heater 5 but a flame burner 6. Accordingly, at step 106 of the flow chart shown in FIG. 2, a quantity of heat (a strength of the flame) generated by the flame burner 6 which is necessary to elevate from the second set temperature (T2) of the silver-alumina-based catalyst device 2' to the third set temperature (T3) is determined. At step 107, the silver-alumina-based catalyst device 2' is heated by the flame burner 6. To maintain the temperature of the silver-alumina-based catalyst device 2' at the third set temperature (T3), the heating by the flame burner 7 is carried out.

The silver-alumina-based catalyst device 2' of FIG. 4 may have a lower layer 2'b which carries silver oxide by alumina as a carrier coat material on a ceramic base 2'a and an upper layer 2'c formed from zeolite or the like. In this case, the upper layer 2'c functions as a HC adsorption layer for adsorbing HC in the exhaust gas. Accordingly, the upper layer 2'c continues adsorbing HC in the exhaust gas to an upper limit from the engine startup. Once the temperature of the silver-alumina-based catalyst device 2' becomes the second set temperature (T2), the flame burner 6 projects the flame into the silver-alumina-based catalyst device 2' without the control of a quantity of generated heat.

Therefore, a part of HC adsorbed in the upper layer 2'c is released from the upper layer 2'c, ignited, and burned. Thereafter, by the burning heat, the remainder of HC adsorbed in the upper layer 2'c is instantaneously released, ignited, and burned. Accordingly, the temperature of the silver-alumina-based catalyst device 2' can be instantaneously elevated.

Thus, at the time (t1) (when the temperature of the silver-alumina-based catalyst device 2' becomes the second set temperature (T2)), the silver-alumina-based catalyst device 2' is heated to increase the temperature elevation rate thereof so that at least part of NO flowing out from the silver-alumina-based catalyst device 2 as it is can be oxidized to $NO_2$ in the silver-alumina-based catalyst device 2 and can be adsorbed therein. Thus, an amount of NO flowing out from the silver-alumina-based catalyst device 2 after the temperature thereof becomes the second set temperature (T2) can be decreased.

The upper limit of HC adsorption in the upper layer varies according to the material and the volume of the upper layer 2'c, and it is preferable that the upper limit is set such that even if all thereof burns, the temperature of the silver-alumina-based catalyst device 2' is not elevated from the second set temperature (T2) to the first set temperature (T1).

The reducing material supply device 4 may be arranged upstream of the silver-alumina-based catalyst device 2. In the case that fuel is used as the reducing material, the fuel injector for injecting fuel into the cylinder can be used as the reducing material supply device and the fuel injector may inject fuel into the cylinder, for example, in the expansion stroke.

LIST OF REFERENCE NUMERALS

1: exhaust passage
2, 2': silver-alumina-based catalyst device
3: $NO_x$ catalyst device
4: reducing material supply device
5: electric heater
6: flame burner

The invention claimed is:
1. An exhaust purification system of an internal combustion engine, comprising:
  a silver-alumina-based catalyst device arranged in an engine exhaust system;
  a temperature estimating device configured to estimate a temperature of the silver-alumina-based catalyst device;
  a heating device configured to heat the silver-alumina-based catalyst device; and
  an electronic control unit operating the heating device so as to heat the silver-alumina-based catalyst device;
  wherein a first set temperature at which said silver-alumina-based catalyst device releases $NO_2$ and a second set temperature at which said silver-alumina-based catalyst device releases NO are set in the electronic control unit, the second set temperature being lower than the first set temperature; and
  wherein the exhaust purification system is configured such that when a temperature of said silver-alumina-based catalyst device becomes the second set temperature, said silver-alumina-based catalyst device is heated by the heating device such that a temperature elevation rate thereof is increased to make the temperature of said silver-alumina-based catalyst device be a third set temperature between said first set temperature and said second set temperature.

2. An exhaust purification system of an internal combustion engine according to claim 1, wherein the heating device comprises a flame burner or an electric heater such that when the temperature of said silver-alumina-based catalyst devices becomes said second set temperature, said silver-alumina-based catalyst device is heated by the flame burner or the electric heater.

3. An exhaust purification system of an internal combustion engine according to claim 1, wherein said silver-alumina-based catalyst device comprises a HC adsorption layer, the heating device comprises a flame burner, and the electronic control unit operates the flame burner such that flame is projected into the silver-alumina-based catalyst to unite and burn HC adsorbed in the HC adsorption layer such that when the temperature of said silver-alumina-based catalyst devices becomes said second set temperature, the HC adsorbed in said HC adsorption layer is ignited and burned so that said silver-alumina-based catalyst device is heated.

4. An exhaust purification system of an internal combustion engine according to claim 1, wherein the electronic control unit is configured to set said third set temperature such that a NO oxidation rate of said silver-alumina-based catalyst device at said third set temperature is equal to or larger than a NO releasing rate of said silver-alumina-based catalyst device at said second set temperature.

\* \* \* \* \*